(12) United States Patent
Benayoun et al.

(10) Patent No.: US 6,950,429 B2
(45) Date of Patent: Sep. 27, 2005

(54) IP DATA TRANSMISSION NETWORK USING A ROUTE SELECTION BASED ON LEVEL 4/5 PROTOCOL INFORMATION

(75) Inventors: Alain Benayoun, Cagnes sur Mer (FR); Jacques Fieschi, St Laurent du Var (FR); Patrick Michel, La Gaude (FR); Jean-Francois Le Pennec, Nice (FR)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 09/838,406

(22) Filed: Apr. 19, 2001

(65) Prior Publication Data
US 2002/0001313 A1 Jan. 3, 2002

(30) Foreign Application Priority Data
Jun. 20, 2000 (EP) ............................................ 00480053

(51) Int. Cl.[7] .............................................. H04L 12/56
(52) U.S. Cl. ........................ 370/389; 370/474; 709/238
(58) Field of Search ............................. 370/465, 395.1, 370/474, 232, 389, 317, 229, 400, 401, 237, 238, 235, 338, 328, 469, 397, 352–356, 230; 379/220, 242, 88.17; 706/47, 226, 219, 224, 238–242, 250; 709/238–242

(56) References Cited

U.S. PATENT DOCUMENTS

| | | | | |
|---|---|---|---|---|
| 5,734,865 A | * | 3/1998 | Yu | 709/250 |
| 6,046,979 A | * | 4/2000 | Bauman | 370/229 |
| 6,335,927 B1 | * | 1/2002 | Elliott et al. | 370/352 |
| 6,640,248 B1 | * | 10/2003 | Jorgensen | 709/226 |
| 6,754,181 B1 | * | 6/2004 | Elliott et al. | 370/252 |

* cited by examiner

Primary Examiner—John Pezzlo
(74) Attorney, Agent, or Firm—William Steinberg; Dillon & Yudell LLP

(57) ABSTRACT

Data transmission system for transmitting packets of data from a source workstation (10) to a destination workstation (18) wherein the packets of data are transmitted over at least an IP network (14) between an ingress node (16) connected to the source workstation and an egress node (20) connected to the destination workstation, wherein each router within the intermediary nodes along the data path from the ingress node to the egress node determines the best route in a routing table defined by the contents of a field contained in each packet of data being received. For this, the router of the ingress node comprises a configuration table which defines the contents of the TOS field in function of information associated with the 4/5 level protocol such as TCP or UDP.

14 Claims, 4 Drawing Sheets

IP DATA TRANSMISSION NETWORK USING A ROUTE SELECTION BASED ON LEVEL 4/5 PROTOCOL INFORMATION

TECHNICAL FIELD

The invention relates to IP data transmission networks wherein the route is determined in each router of the data path by using a combination of metrics, and relates in particular to an IP data transmission network that selects routes based on level 4/5 information.

BACKGROUND

When data packets are transmitted from a source workstation to a destination workstation over an IP data transmission network, the packets are routed from node to node in the network by a routing mechanism implemented by a router in each node of the data path.

Each IP datagram received by a node and which specifies a destination address other than the local node address is subject to the IP routing algorithm by the router of the node which selects the next node for the datagram. For this, the router uses a routing table which contains information about the other routers of its own network and about IP networks to which its own network is attached.

The routing mechanism enables the optimal routing path to be determined. Such a path determination is based on a variety of metrics or a combination of metrics, such metrics being values resulting from algorithmic computations on a particular variable or values directly input by the router administrator. The comparison of the metrics allows the router to determine the optimal routes and therefore to establish the routing table.

Many different metrics have been used in routing algorithms. Sophisticated routing algorithms can base the route selection on multiple metrics, combining them in a manner resulting in a single metric. For this, several metrics may be used. Path length is the most common metric. Some routing protocols allow the network administrator to assign arbitrary costs to each network link. In this case, the path length is the sum of the costs associated with each link traversed. Another important metric to be used is the communication cost, insofar as some companies may not care about performance whereas they care about operating expenditures. Other metrics may also be used, such as the reliability (usually described in terms of bit error rate) of each network link, delay (the time required to move a packet from a source to a destination), bandwidth (available traffic capacity of a link), or load (the degree to which a network resource such a router is busy).

All the information used by the routing protocol to determine the metrics comes from the lowest three layers of the protocol stack. It is important to note that in the internet protocols as well as in the Open System Interconnect (OSI) model, the layer which defines the packet delivery, including routing, is the third layer. Put conversely, the upper layers of the protocol stack, which constitute the layer 4/5 in the network procedures, are not used to determine metrics and therefore to build the routing table. These upper layers define the application such as the Transmission Control Protocol (TCP) or the User Datagram Protocol (UDP).

There have been several attemps to use the level 4/5 information in the routing algorithm. All these approaches were based on the assumption that the source and destination workstations provide information to the routers and support a specific protocol to set the inputs. These attempts, which focused on using level 4/5 information (for the TCP/IP model as well as for the OSI model), have been abandoned, as the did not result in stable and durable implementations. One such attempt was implemented in OSPF, using the configuration parameters called Type of Service (TOS). This mechanism requires the application to set the TOS field in all IP data generated by the source workstation. Unfortunately, the support of TOS in routing requires modifications to the application. Today, no application is implemented in such a way. Therefore, the use of the TOS field has been dropped in recent OSPF implementations according to the latest RFC recommendations. Some other attempts use a priority queue in the routers: the router tries to look at some field significant of level 4/5 application layer when receiving the IP data packets, in order to set some priority in an input/output buffer. Such a mechanism acts on the data transmission speed, but does not modify the routing path.

SUMMARY OF THE INVENTION

Accordingly, the main object of the present invention is to provide a route selection in the routing algorithm of an IP data transmission network which depends upon the type of application used in a communication between a source workstation and a destination workstation.

Another object of the present invention is to select a routing path in OSPF routing protocol according to the TCP or UDP port required in each router of a transmission path in an IP data transmission network.

The invention relates therefore to a data transmission system for transmitting packets of data from a source workstation to a destination workstation. Packets of data are transmitted over a communication network such as an IP network between an ingress node connected to the source workstation and an egress node connected to the destination workstation. Each router within the intermediary nodes along the data path from the ingress node to the egress node determines the best route in a routing table defined by the contents of a field contained in each packet of data being received. To accomplish this, the router at the ingress node comprises a configuration table which associates the contents of the field with information carried by a protocol layer above the IP level, generally the 4/5 level such as TCP or UDP. In one embodiment of the invention, the field employed is the Type-of-Service (TOS) field.

BRIEF DESCRIPTION OF THE DRAWINGS

The above and other objects, features and advantages of the invention will be better understood by reading the following description of the invention in conjunction with the accompanying drawings wherein.

DETAILED DESCRIPTION OF THE INVENTION

Figure 1:
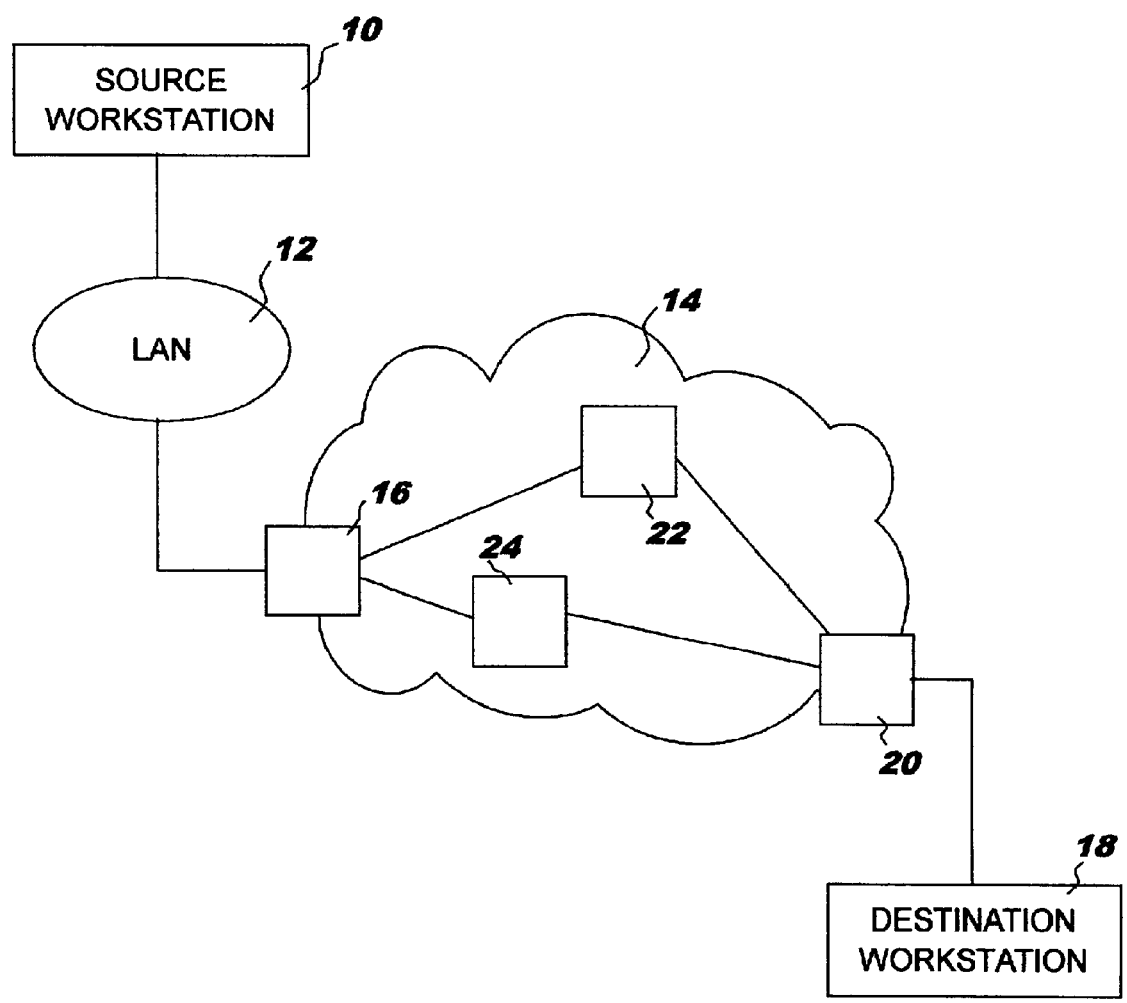
FIG. 1 is a block-diagram representing a data transmission network wherein the invention may be implemented.

A data communication system that is suitable for accomodating the present invention is shown in FIG. 1. As a source workstation 10 attached to a LAN 12 may access an IP network 14 through an ingress node 16, in order to transmit packets of data to a destination workstation 18 that is connected to the network 14 by an egress node 20.

The optimal route, which is found by computing a combination of metrics, is determined in the ingress node 20 according to the level 4/5 information as described below. With one application, such a route could be through a first intermediary node 22, whereas with a different application the optimal route could be through a second intermediary node 24.

For example, suppose that the first application is a Voice-over-Internet-Protocol session (VoIP) requiring low delay, but not requiring a large bandwidth, and suppose that the second application is a data batch transfer using File Transfer Protocol (FTP), without any particular delay requirement but requiring large throughput. Further, suppose that the delay through the first intermediate node 22 is less than the delay though the second intermediate node 24 but, the overall bandwidth on the former route is limited. Also, suppose that the delay through the second intermediate node 24 is greater but a lot of free bandwidth is available on this second route. Because of the shorter delay on the route through the first intermediate node 22, both sessions, voice and data, would be established on this route when using legacy OSPF, whereas the invention based on the 4/5 level information enables two optimal routes to be established, thereby improving the load balancing between all routes in the network.

Figure 2:
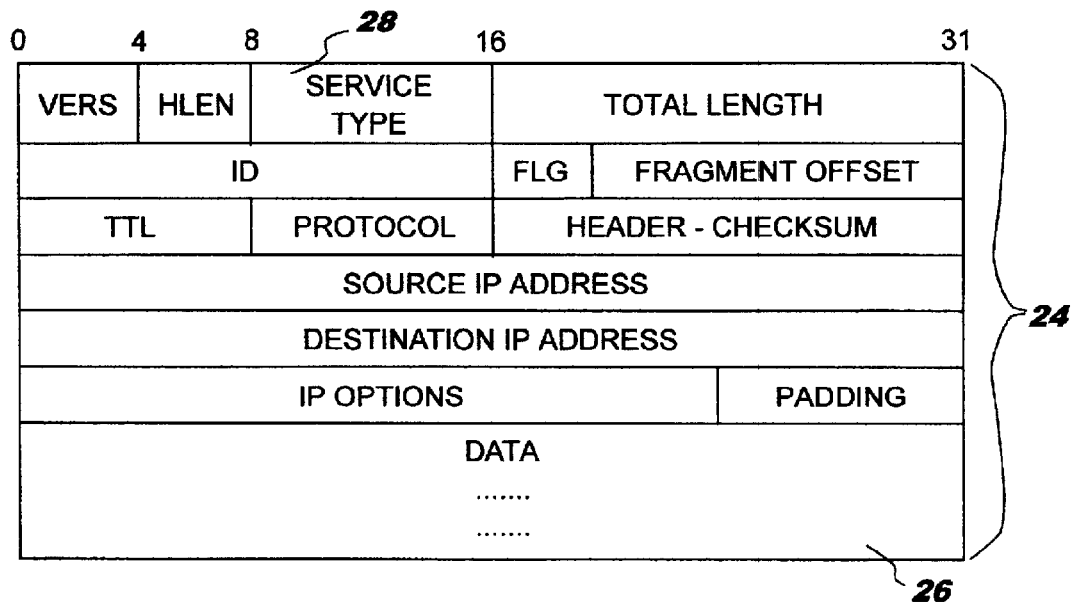
FIG. 2 is a schematic representation of an IP datagram with the various fields of the IP header.
Figure 3:
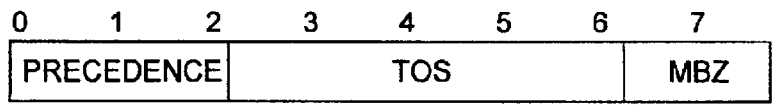
FIG. 3 shows the contents of the service type field of the IP datagram including the TOS bits.

As illustrated in FIG. 2, an IP datagram data includes an IP header 24 containing the information necessary to send the packet in correct form over the route, such as the source IP address or the IP destination address, and the IP data field 26. The header 24 includes a service type field 28, which is illustrated in FIG. 3. Such a service type field includes two bits for precedence (a measure of the priority of the datagram), a MBZ bit (must be zero) reserved for future use, and four Type Of Service bits (bits 3–6), which characterize some parameters of the application such as the propagation time, the throughput, and the reliability.

Figure 4:
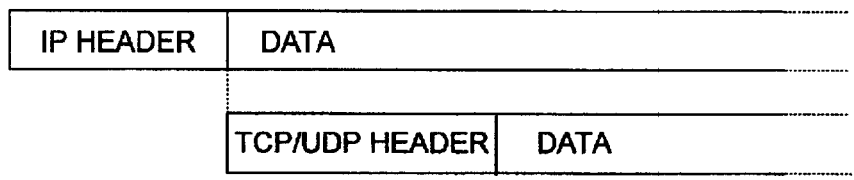
FIG. 4 is a schematic representation of the IP datagram showing the TCP/UDP header after the IP header.

As shown in FIG. 4, the IP data field 26 of an IP datagram includes a header TCP/UDP and data. Note that in both TCP and UDP protocols and other 4/5 level protocols, the header includes a field containing the source port number and a field containing the destination port number.

Figure 6:
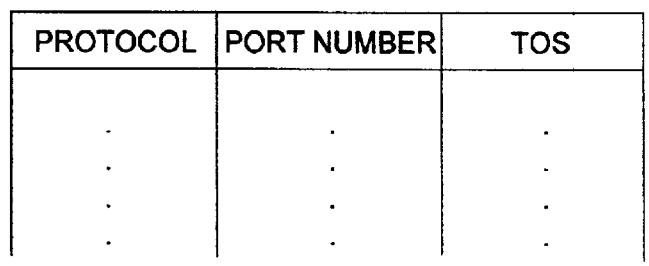
FIG. 6 is a schematic representation of configuration table used in the data transmission system according to the invention.
Figure 5:
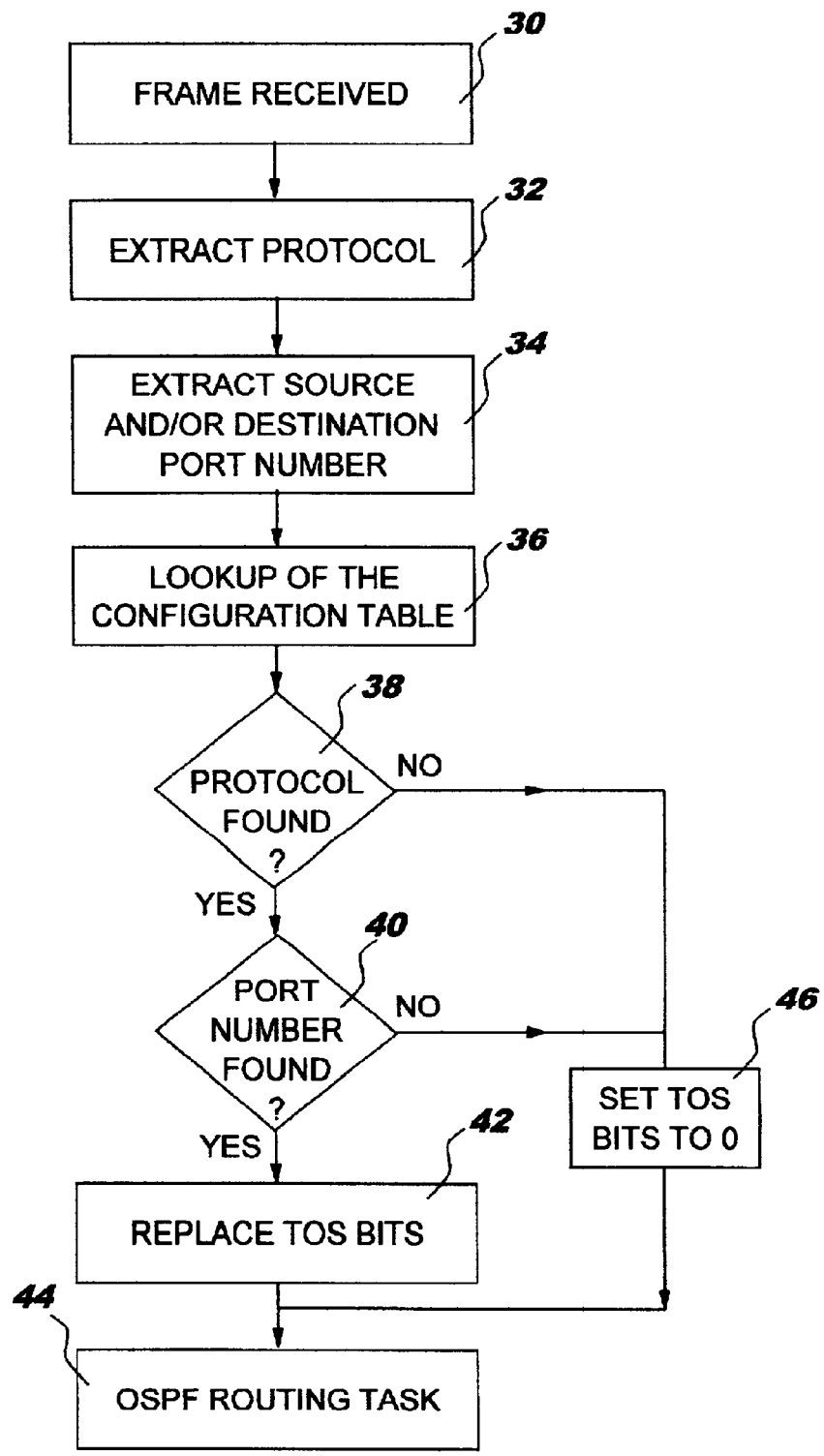
FIG. 5 is a flow-chart of the operation of an ingress node according to the invention.

FIG. 5 shows the operation of the ingress node 16 (see FIG. 1), when a frame is received (step 30). First, the protocol identification is made by extracting (step 32) the associated field in the IP header 24 of the IP datagram (see FIG. 2). The source and/or destination port number is also extracted (step 34) from the 4/5 level header. Then, there is a lookup of a configuration table represented in FIG. 6 (step 36). Such a configuration table provides the TOS field corresponding to a given protocol and a given port number (source and/or destination). It must be noted that, insofar as there can be numerous port numbers for each protocol being identified, such a table may not contain all possible cases.

The lookup of the configuration table determines whether an entry of the table is associated with the protocol being identified (step 38). If so, it is then determined whether the port number extracted from the 4/5 level header is identified in the configuration table (step 40). If the port number is found, the TOS bits in the IP datagram are replaced (step 42) by the bits which are found in the configuration table. It must be noted that the TOS bits are previously all zeros corresponding to the default route. Finally, the routing task is achieved by the OSPF protocol or an equivalent protocol (step 44) before transmitting the frame over the network.

When the protocol being identified in the IP datagram does not correspond to any entry in the configuration table, or when the port number for this protocol is not found in the configuration table corresponding to the port number identified in the 4/5 level header, the TOS bits are set to zero or not changed if they were already set to zero (step 46). Then, the OSPF (or equivalent protocol) routing task is achieved by the router (step 44). Note that, in the latter case, the "all zeros" TOS defines only the default route.

Figure 7:
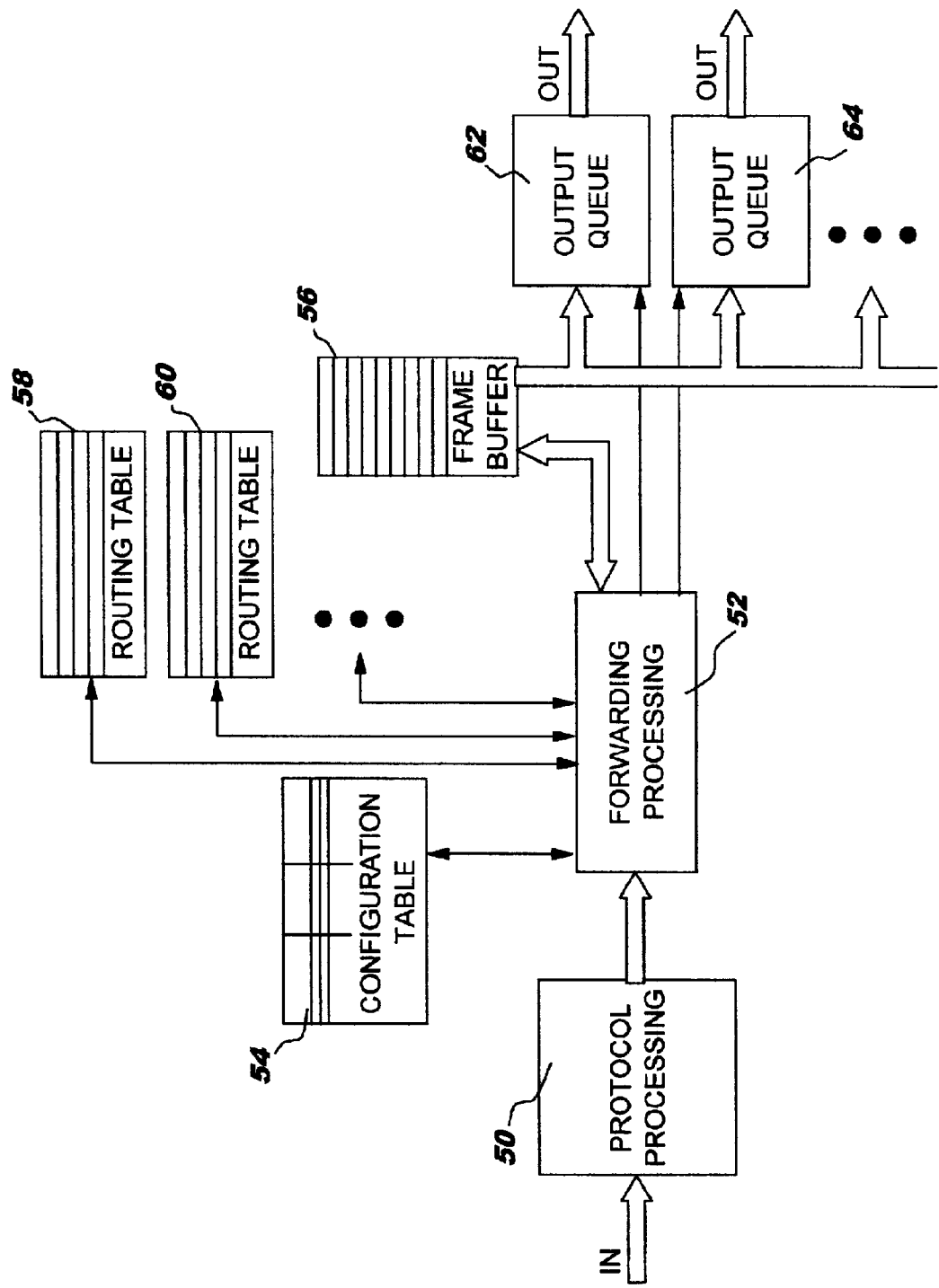
FIG. 7 is a block-diagram representing the router of the ingress node according to the invention.

As illustrated in FIG. 7, the router of ingress node 20 (see FIG. 1) includes a protocol processing unit 50 which identifies the protocol associated with the application in the received frame. Thus, such a protocol can be UDP plus Real Time Protocol (RTP) for the voice flow, or TCP plus FTP for the data flow. Note that the protocol processing unit 50 also looks for the port number associated with the protocol in the frame header as already mentioned.

When the protocol and the port number are identified by the protocol processing unit 50, the frame-together with this information is transmitted to a forwarding processing unit 52. The protocol and the port number enable the forwarding processing unit 52 to look in the configuration table 54 for determining the value of TOS bits corresponding to this protocol and this port number. Then, the forwarding processing unit 52 replaces in the frame the previous TOS bits (generally zero bits) by the value determined in the configuration table 54, and stores the frame into a frame buffer 56. The TOS value also enables the forwarding processing unit 52 to select an appropriate routing table identifying the route to be used, for example a routing table 58 containing routing information for the UDP protocol, or a routing table 60 containing routing information for the TCP protocol. Then, the forwarding processing unit 52 utilizes this routing information to select an output queue for transmitting the frame over the network. In the previous example, the voice frame using UDP will have routing information that will enable the transfer of the voice frame from the frame buffer 56 to an output queue 62 for transmission to the first intermediate node 22, whereas the data frame using TCP will have routing information that will enable the transfer of the data frame from the frame buffer 56 to an output queue 64 for transmission to the second intermediate node 24.

The routers of all the other nodes of the route such as the first and second intermediate nodes 22 and 24 include the same components except the configuration table, since these nodes have no need to determine and to change the value of the TOS field in the frame. In the same way as in the ingress node, the TOS value enables each router to select the appropriate routing table in order to know the routing information and to transmit the frame to the next node of the route.

We claim:

1. A method comprising:

defining a routing table for each of a plurality of different transport layer protocols used in data packet transmission, wherein each of the different transport layer protocols is associated with a specific routing table, and wherein the different transport layer protocols are selected from a group that includes a Transmission Control Protocol (TCP) and a User Datagram Protocol (UDP), and wherein each routing table associates one of the different transport layer protocols with a plurality of port numbers;

examining a header of a data packet in a lower layer to identify a transport layer protocol and a port number used by the data packet;

routing the data packet in said lower layer according to a nodal pathway described by one of the routing tables according to the transport layer protocol and the port number used by the data packet; and in response to none of the routing tables containing a nodal pathway for the transport layer protocol and the port number used by the data packet, routing the data packet in said lower layer a pre-defined default nodal pathway.

2. The method of claim 1, further comprising:

in response to finding an entry in the routing table that matches the transport layer protocol and the port number used by the data packet, replacing Type of Service (TOS) bits in the data packet with TOS bits listed in the routing table as being associated with a specific transport layer protocol and port number, wherein the TOS bits characterize a desired transmission parameter for the data packet.

3. The method of claim 2, wherein the desired transmission parameter is selected from one or more of a group that includes propagation time, throughput and reliability of transmission of the data packet.

4. The method of claim 3, further comprising:

in response to none of the routing tables containing a nodal pathway for the transport layer protocol and port number used by the data packet, setting all of the TOS bits to a default value.

5. The method of claim 1, farther comprising:

identifying an application that is using the data packet; and associating the application with one of the different transport layer protocols.

6. The method of claim 5, wherein the application is for a voice flow, and wherein the application uses UDP plus a Real Time Protocol (RTP) for the voice flow.

7. The method of claim 5, wherein the application is for a data flow, and wherein the application uses TCP plus File Transfer Protocol (FTP) for the data flow.

8. A router comprising:

logic for defining a routing table for each of a plurality of different transport layer protocols used in data packet transmission, wherein each of the different transport layer protocols is associated with a specific routing table, and wherein the different transport layer protocols are selected from a group that includes a Transmission Control Protocol (TCP) and a User Datagram Protocol (UDP), and wherein each routing table associates one of the different transport layer protocols with a plurality of port numbers;

logic in a lower layer for identifying a transport layer protocol and a port number used by a data packet;

logic for routing the data packet in said lower layer according to a nodal pathway described by one of the routing tables according to the transport layer protocol and the port number used by the data packet; and logic for, in response to none of the routing tables containing a nodal pathway for the transport layer protocol and the port number used by the data packet, routing the data packet in said lower layer via a pre-defined default nodal pathway.

9. The router of claim 8, further comprising:

logic for, in response to finding an entry in the routing table that matches the transport layer protocol and the port number used by the data packet, replacing Type of Service (TOS) bits in the data packet with TOS bits listed in the routing table as being associated with a specific transport layer protocol and port number, wherein the TOS bits characterize a desired transmission parameter for the data packet.

10. The router of claim 9, wherein the desired transmission parameter is selected from one or more of a group that includes propagation time, throughput and reliability of transmission of the data packet.

11. The router of claim 10, further comprising:

logic for, in response to none of the routing tables containing a nodal pathway for the transport layer protocol and port number used by the data packet, setting all of the TOS bits to a default value.

12. The router of claim 8, farther comprising:

logic for identifying an application that is using the data packet; and logic for associating the application with one of the different transport layer protocols.

13. The router of claim 12, wherein the application is for a voice flow, and wherein the application uses UDP plus a Real Time Protocol (RTP) for the voice flow.

14. The router of claim 12, wherein the application is for a data flow, and wherein the application uses TCP plus File Transfer Protocol (FTP) for the data flow.

* * * * *

UNITED STATES PATENT AND TRADEMARK OFFICE
CERTIFICATE OF CORRECTION

PATENT NO. : 6,950,429 B2  Page 1 of 1
APPLICATION NO. : 09/838406
DATED : September 27, 2005
INVENTOR(S) : Benayoun et al.

It is certified that error appears in the above-identified patent and that said Letters Patent is hereby corrected as shown below:

In Claim 1, at column 5, line 14, after "layer" and before "a" insert --via--.

In Claim 5, at column 5, line 34, delete "farther" and insert --further--.

In Claim 12, at column 6, line 37, delete "farther" and insert --further--.

Signed and Sealed this

First Day of August, 2006

JON W. DUDAS
*Director of the United States Patent and Trademark Office*